(12) United States Patent
Kishimoto et al.

(10) Patent No.: US 7,764,941 B2
(45) Date of Patent: Jul. 27, 2010

(54) RADIO COMMUNICATIONS APPARATUS

(75) Inventors: Shuya Kishimoto, Tokyo (JP); Kenichi Maruhashi, Tokyo (JP)

(73) Assignee: NEC Corporation, Tokyo (JP)

( * ) Notice: Subject to any disclaimer, the term of this patent is extended or adjusted under 35 U.S.C. 154(b) by 830 days.

(21) Appl. No.: 10/584,241

(22) PCT Filed: Dec. 3, 2004

(86) PCT No.: PCT/JP2004/018010

§ 371 (c)(1),
(2), (4) Date: Jun. 23, 2006

(87) PCT Pub. No.: WO2005/062474

PCT Pub. Date: Jul. 7, 2005

(65) Prior Publication Data

US 2007/0149147 A1    Jun. 28, 2007

(30) Foreign Application Priority Data

Dec. 24, 2003    (JP) ............................. 2003-426041

(51) Int. Cl.
H04B 1/26    (2006.01)
(52) U.S. Cl. ...................... 455/326; 455/208; 455/209; 455/311
(58) Field of Classification Search .................. 455/102, 455/302, 192.1, 303, 304, 311–319, 323–324, 455/255–259, 265, 192.2, 192.3, 232, 210, 455/295, 326, 208–209, 232.1; 375/344
See application file for complete search history.

(56) References Cited

U.S. PATENT DOCUMENTS 5,896,216 A    4/1999    Kikushima et al.

(Continued)

FOREIGN PATENT DOCUMENTS

JP    08-125447    5/1996

(Continued)

OTHER PUBLICATIONS

Y. Shoji et al., "60 GHz Band 64QAM/OFDM Terrestrial Digital Broadcasting Signal Transmission by Using Millimeter-Wave Self-Heterodyne System," IEEE Transactions on Broadcasting, vol. 47:3, Sep. 2001, pp. 218-227.

*Primary Examiner*—Pablo N Tran
(74) *Attorney, Agent, or Firm*—Foley & Lardner LLP (57) ABSTRACT

A bit error rate of the reception signal is detected on the reception side, such that an n optimal modulation method and LO output power are determined in accordance with this bit error rate, and an LO output changing instruction is sent to an image signal rejection mixer on the transmission side. The image signal rejection mixer changes the phase $X=\alpha+\gamma$ in response to the LO output changing instruction when power splitter (201) splits the LO into two components with equal amplitude and phase difference $\alpha$, power splitter (202) splits the IF signal into two components with equal amplitude and phase difference $\beta$, and power combiner (205) combines RF signals with equal amplitude and phase difference $\gamma$. By changing the X, the LO output power is controlled and the back-off amount of a transmission amplifier is changed in accordance with an optimal modulation scheme. In this event, $\alpha-\beta+\gamma=2n\pi$ (n is an integer) is set so as to maximize the image signal rejection amount.

2 Claims, 13 Drawing Sheets

U.S. PATENT DOCUMENTS

| | | | |
|---|---|---|---|
| 6,240,147 B1 * | 5/2001 | Muramatsu et al. | 375/344 |
| 6,389,080 B1 * | 5/2002 | Barnes | 375/269 |
| 6,694,131 B1 * | 2/2004 | Lakkis | 455/302 |
| 6,826,234 B1 | 11/2004 | Shoji et al. | |
| 6,907,089 B2 * | 6/2005 | Jensen et al. | 375/324 |
| 6,970,140 B2 * | 11/2005 | Hibino et al. | 343/860 |
| 6,987,794 B1 * | 1/2006 | Kohno et al. | 375/136 |
| 7,209,523 B1 * | 4/2007 | Larrick et al. | 375/295 |
| 7,254,755 B2 * | 8/2007 | de Obaldia et al. | 714/715 |
| 7,460,850 B2 * | 12/2008 | Iwaida | 455/318 |
| 2004/0114549 A1 | 6/2004 | Moyoshi | |
| 2004/0153879 A1 * | 8/2004 | Fukutani et al. | 714/48 |
| 2004/0183604 A1 * | 9/2004 | Ammar et al. | 331/100 |
| 2005/0003773 A1 * | 1/2005 | Cowley et al. | 455/150.1 |
| 2005/0162210 A1 * | 7/2005 | Tanzawa | 327/352 |
| 2006/0056546 A1 * | 3/2006 | Hayase et al. | 375/332 |
| 2006/0072629 A1 * | 4/2006 | Kent et al. | 370/516 |

FOREIGN PATENT DOCUMENTS

| | | |
|---|---|---|
| JP | 08-186449 | 7/1996 |
| JP | 09-200282 | 7/1997 |
| JP | 09-326769 | 12/1997 |
| JP | 2000-013246 A | 1/2000 |
| JP | 2001-053640 A | 2/2001 |
| JP | 2003-198262 A | 7/2003 |
| JP | 2003-218830 A | 7/2003 |
| JP | 2004-166260 A | 6/2004 |

* cited by examiner

RADIO COMMUNICATIONS APPARATUS

TECHNICAL FIELD

The present invention relates to a radio communications apparatus and radio communication method, as well as a mixer for use therein, and more particularly, to improvements in a radio communications system which simultaneously sends a local oscillation signal and a radio frequency band signal.

BACKGROUND ART

The following Document 1, for example, discloses one communications scheme which simultaneously sends a radio frequency band (RF) signal generated by up-converting an intermediate frequency band (IF) signal, and a local oscillation (LO) signal used for the up-conversion. The reception side of this communications scheme performs demodulation using the received LO signal and RF signal. Accordingly, a receiver can eliminate an expensive local oscillator mounted therein, thus providing a low-cost communications system.

Document 1: JP-A-2001-53640

The following Document 2 describes that in such a communications scheme, the RF signal must be equal in power to the LO signal under the conditions of constant transmission power, in order to optimize the carrier to noise ratio (C/N) index on the receiver side. For this reason, the IF input power must be set at a point at which the RF output power matches the LO output power, so that the amount of back-off from P1 dB (1 dB gain compression point) in a transmitter is determined by this matching point.

Document 2: Yozo Shoji et al, "60 Ghz Band 64 QAM/OFDM Terrestrial Digital Broadcasting Signal Transmission by Using Millimeter-Wave Self-Heterodyne System," IEEE TRANSACTIONS ON BROADCASTING, VOL. 47, No. 3, September 2001, pp. 218-227

Figure 1:
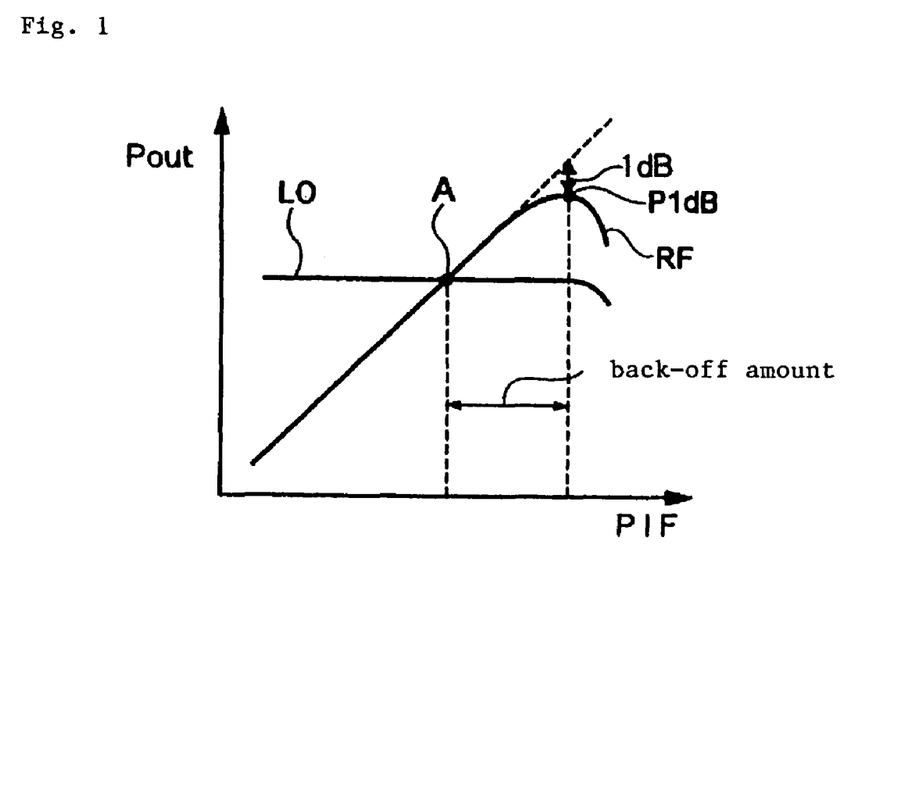
FIG. 1 is a diagram for describing a back-off amount.

Here, the back-off amount will be described with reference to FIG. 1. Referring to FIG. 1, there is shown a relationship between the output power of the LO signal (labeled LO) and the output power of the RF signal (labeled RF) to PIF which is the IF input power, where the amount of power from P1 dB, which is a 1 dB compression point of the RF signal, in a decreasing direction is called the back-off amount. A reduction in the back-off amount brings the RF signal into a non-linear region, causing a problem of distortions in the output. Therefore, an optimal value exists for the back-off amount, however, as mentioned above, the IF input power must be set at point A at which the RF output power matches the LO output power, so that the back-off amount from P1 dB in the transmitter is determined by this matching point.

Figure 2:
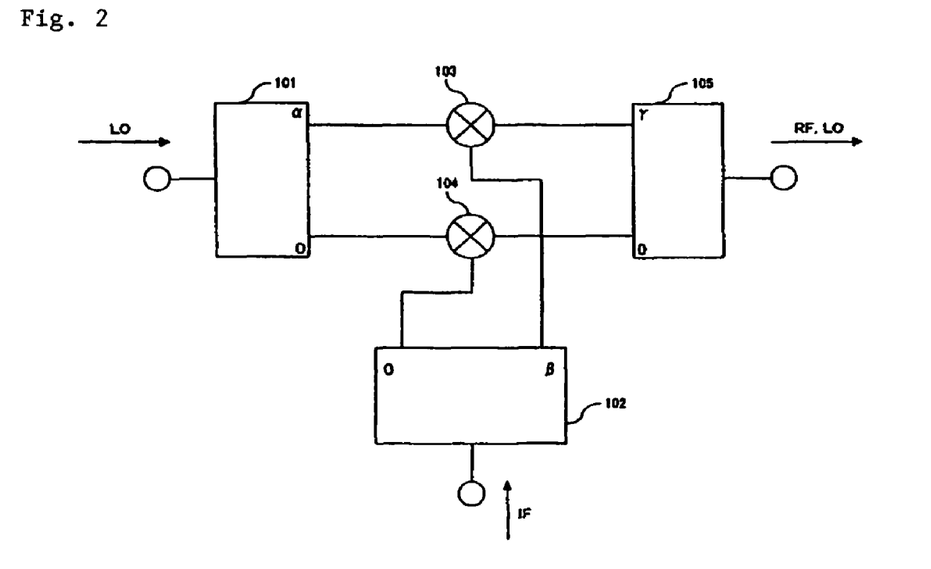
FIG. 2 is a diagram illustrating a conventional image rejection mixer.

Consider herein that a conventional image rejection mixer is used in the communications scheme described in the aforementioned Patent Document 1. FIG. 2 is a diagram illustrating the configuration of a conventional image signal rejection mixer. Power splitter 101 splits an LO signal generated from an LO signal oscillator into two components which are supplied to mixer 103 and mixer 104. Power splitter 102 splits an IF signal into two components which are supplied to mixer 103 and mixer 104. Mixers 103 and 104 each generate an RF signal from the LO signal and IF signal supplied thereto, and supply the RF signal and LO signal to power combiner 105. Power combiner 105 combines the LO signal and RF signal delivered from mixer 103 and the LO signal and RF signal delivered from mixer 104, and delivers the combined signal with a suppression image.

Here, power splitter 101 splits the LO signal into two components which are equal in amplitude and have phase difference $\alpha$. Power splitter 102 splits the IF signal into two components which are equal in amplitude and have phase difference $\beta$. Power combiner 105 combines the powers with an equal amplitude and a phase difference $\gamma$. In this event, $\alpha$, $\beta$, $\gamma$ are set such that the phase relationship satisfies:

$$\alpha+\beta+\gamma=2n\pi \quad (1)$$

and $$\alpha-\beta+\gamma=(2n+1)\pi \text{ (}n\text{ is an integer)} \quad (2)$$

in order to maximize an image signal rejection ratio. In this event, the LO power has a value determined by:

$$\alpha+\gamma=(2n+\tfrac{1}{2})\pi \quad (3)$$

Incidentally, when the quality of communication varies following variations in the communication environment, good communications cannot be made unless the modulation scheme is changed to be suitable to a particular communication environment (quality of communication). Then, it is known that an optimal back-off amount exists for P1 dB of the transmitter output in a modulation scheme, and for this reason, if the back-off amount is changed in line with variations in the communication environment, a problem arises in that the modulation scheme cannot be changed such that it is suitable to the communication environment.

When communications are made as described in Patent Document 1 using a conventional image rejection mixer, the LO power has a value determined by a phase:

$$\alpha+\gamma=(2n+\tfrac{1}{2})\pi$$

When communications are made to result in optimal reception C/N, the back-off amount is determined to be at IF power at which the LO output power is equal to the RF output power, resulting in a failure in communications made at an back-off amount suitable to a communication environment.

DISCLOSURE OF THE INVENTION

It is an object of the present invention to provide a radio communications apparatus and a radio communication method which are capable of changing an LO output power in accordance with a modulation scheme which can be changed in accordance with changes in the quality of communication due to a varying communication environment, and to provide a mixer for use in the same.

A radio communications apparatus according to the present invention is a radio communications apparatus for simultaneously transmitting a radio frequency band signal and a local oscillation signal used when an intermediate frequency band signal is converted to the radio frequency band signal by a mixer, and is characterized by comprising control means for changing a modulation scheme in accordance with the quality of communication and controlling the output power of the local oscillation signal.

A radio communication method according to the present invention is a radio communication method for simultaneously transmitting a radio frequency band signal and a local oscillation signal used when an intermediate frequency band signal is converted to the radio frequency band signal, and is characterized by comprising a modulation scheme changing control step for changing a modulation scheme in accordance with the quality of communication, and by comprising a step for controlling an output power of the local oscillation signal in accordance with the quality of communication.

A program according to the present invention is a program for causing a computer to execute a radio communication method for simultaneously transmitting a radio frequency band signal and a local oscillation signal used when an intermediate frequency band signal is converted to the radio frequency band signal, and is characterized by causing the computer to execute processing for changing a modulation scheme in accordance with the quality of communication, and to execute processing for controlling output power of the local oscillation signal in accordance with the quality of communication.

A mixer according to the present invention is a mixer in a radio communications apparatus for simultaneously transmitting a radio frequency band signal and a local oscillation signal used when an intermediate frequency band signal is converted to the radio frequency band signal, and is characterized in that output power of the local oscillation signal can be controlled by a control signal in accordance with the quality of communication.

Operations of the present invention will be described. The LO output power is controlled in the RF unit simultaneously with the control of a modulation scheme for transmission signals in accordance with the quality of communication measured on the basis of a received signal received by the antenna. By conducting such control, the back-off amount can be freely changed to provide an optimal modulation method in accordance with variations in radio communication environment.

BRIEF DESCRIPTION OF THE DRAWINGS

[FIG. 1]
[FIG. 2]
[FIG. 3]
[FIG. 4]
[FIG. 5]
[FIG. 6]
[FIG. 7]
[FIG. 8a]
[FIG. 8b]
[FIG. 8c]
[FIG. 9]

[FIG. 10]
[FIG. 11]
[FIG. 12]
[FIG. 13]
[FIG. 14]
[FIG. 15]
[FIG. 16]

BEST MODE FOR CARRYING OUT THE INVENTION

In the following, embodiments of the present invention will be described with reference to the drawings.

First Embodiment

Figure 3:
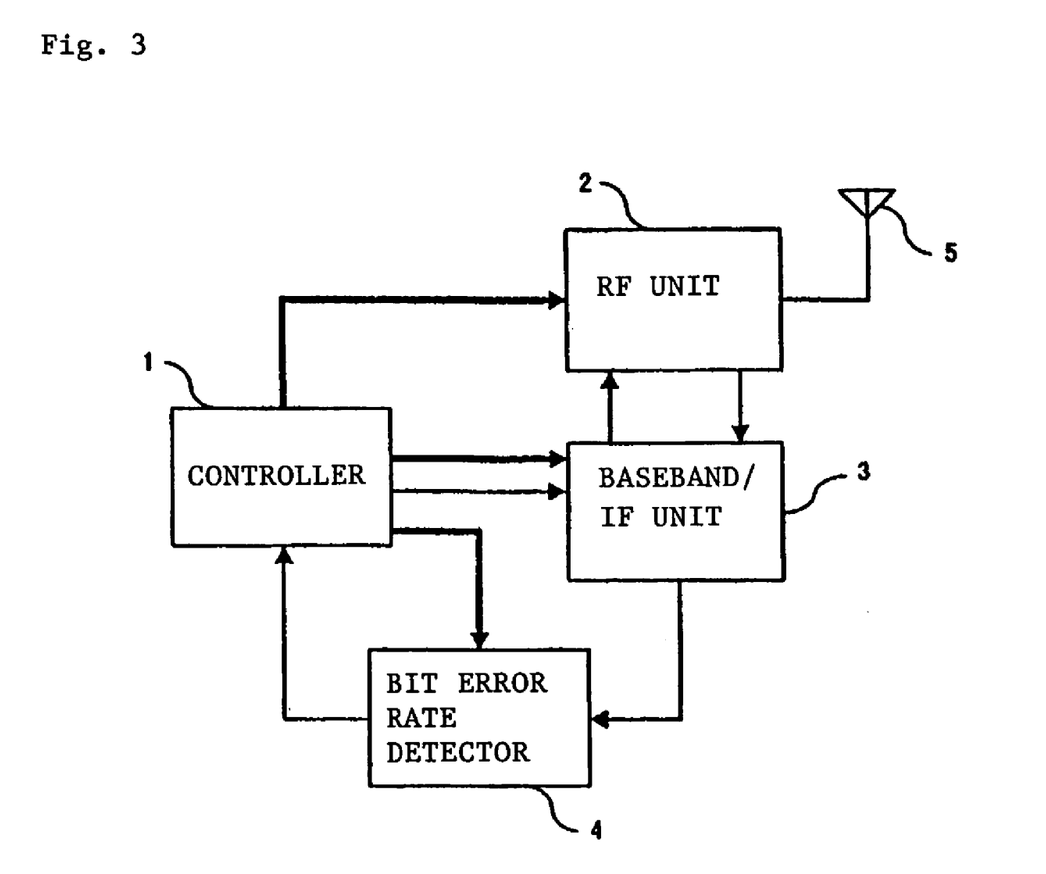
FIG. 3 is a schematic configuration diagram of a radio communications apparatus according to the present invention.

FIG. 3 illustrates the configuration of the system according to a first embodiment of the present invention. The system comprises controller 1, RF unit 2, baseband/IF unit 3, bit error rate detector 4, and antenna unit 5. In the figure, bold lines represent control signal lines, while thin lines represent information signal lines (the same applies to the following). RF unit 2 converts an RF signal received by antenna unit 5 to an IF signal. The IF signal converted by RF unit 2 is supplied to baseband/IF unit 3. This baseband/IF unit 3 demodulates data from the supplied IF signal, and supplies the data to bit error rate detector 4. Bit error rate detector 4 detects a bit error rate (BER) from the data supplied thereto, and transmits the BER, which is the result of the detection, and demodulated data to controller 1.

Figure 4:
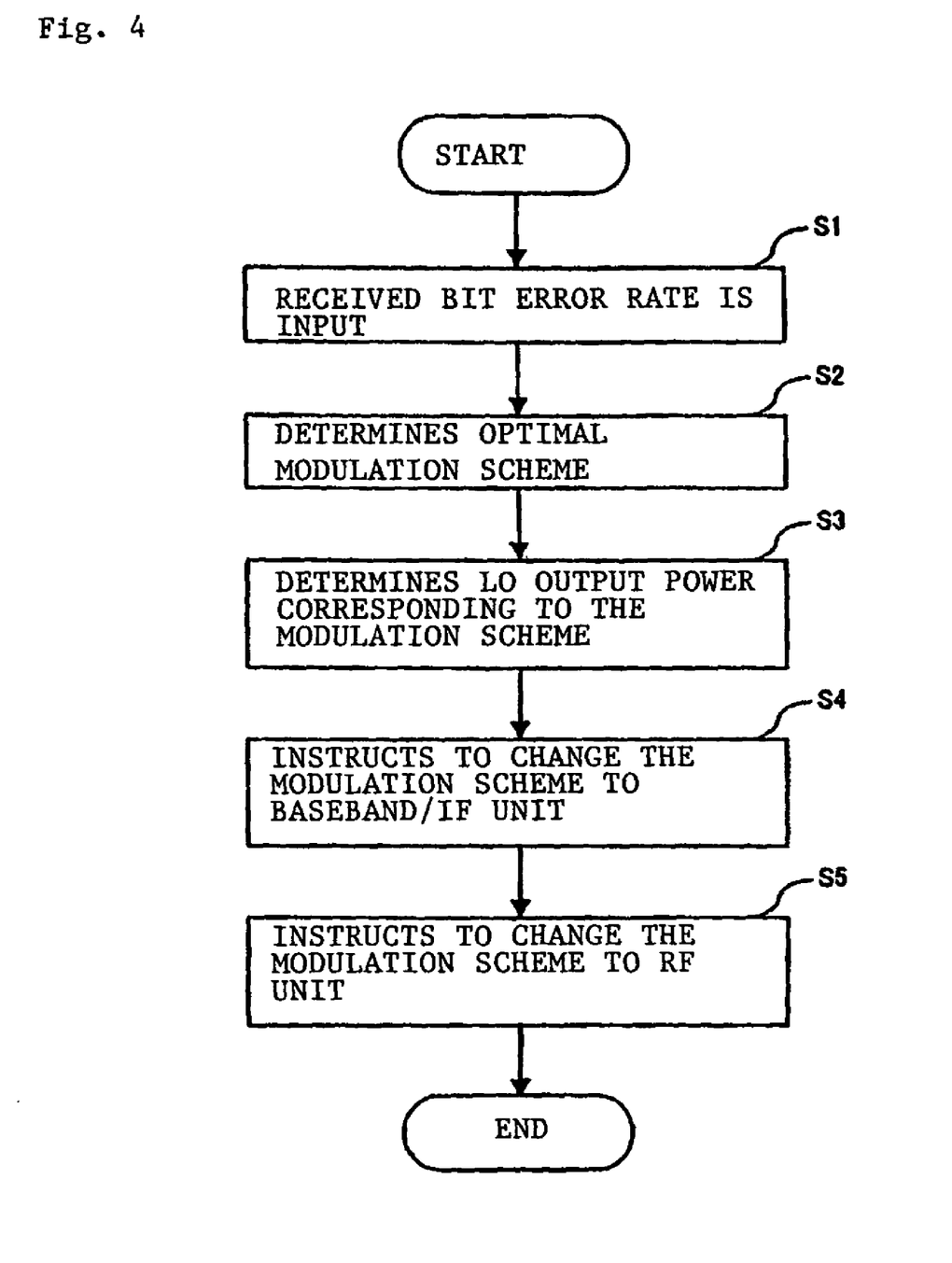
FIG. 4 is a schematic flow chart illustrating the operation of controller 1 in FIG. 3.

FIG. 4 is a schematic flow diagram illustrating the operation of this controller 1. Controller 1 determines, based on the BER supplied thereto (step S1), an optimal modulation scheme for the BER (step S2), and determines an LO output power corresponding to the determined modulation scheme (step S3). Then, controller 1 issues a modulation scheme changing instruction to baseband/IF unit 3 (step S4), and simultaneously transmits an LO output power changing instruction to RF unit 2 (step S5).

Baseband/IF unit 3 sets a modulation scheme for transmission data to a modulation scheme in accordance with the modulation scheme changing instruction from controller 1, modulates the transmission data in accordance with this modulation scheme, and supplies the modulated data to RF unit 2 as an IF signal. RF unit 2, in turn, changes the LO output power in accordance with the LO output power changing instruction from controller 1, and transmits an RF signal and an LO signal to antenna 5. As can be appreciated, controller 1 does not transmit the modulation scheme changing instruction to baseband/IF unit 3 or the LO output power changing instruction to RF unit 2 unless there is a change in the detected bit error rate.

Figure 5:
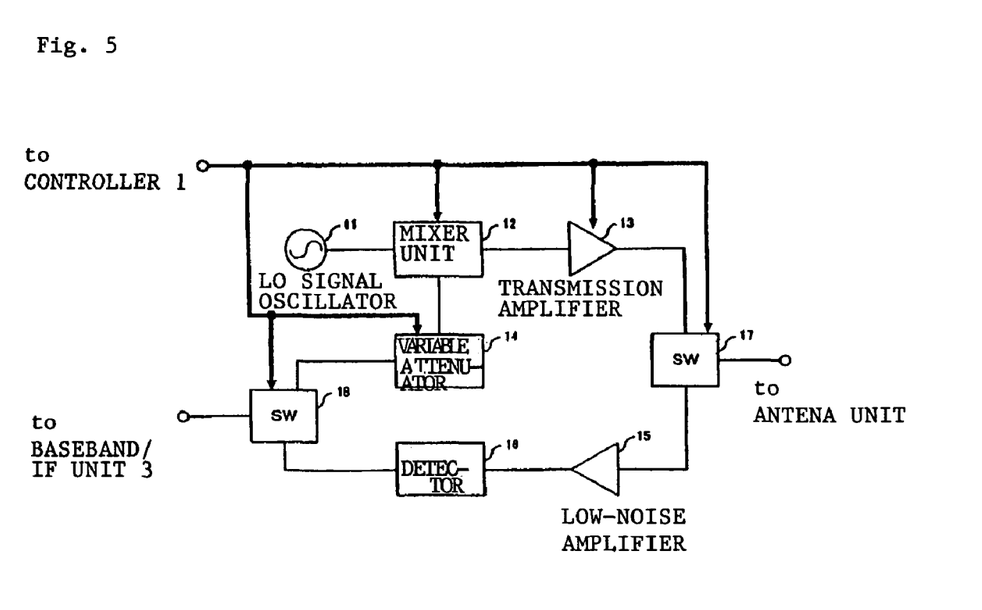
FIG. 5 is a diagram illustrating the configuration of RF unit 2 in FIG. 3.

FIG. 5 is a block diagram illustrating the configuration of RF unit 2. RF unit 2 comprises LO signal oscillator 11, mixer unit 12, transmission amplifier 13, variable attenuator 14, low-noise amplifier 15, detector 16, and transmission/reception change-over switches (SW) 17, 18. LO signal oscillator 11 oscillates an LO signal for up-converting an IF signal, and, supplies the LO signal to mixer unit 12. Mixer unit 12 up-converts an IF signal supplied from variable attenuator 14, using the LO signal supplied from LO signal oscillator 11, to generate an RF signal.

Also, mixer unit 12 simultaneously supplies the generated RF signal and the LO signal used for the up-conversion to transmission amplifier 13. Mixer unit 12 also adjusts the output power of the LO signal in accordance with the LO signal output power changing instruction supplied thereto from controller 1, and supplies the adjusted LO signal to transmission amplifier 13. Transmission amplifier 13 amplifies the RF signal and LO signal supplied from mixer unit 12 to a transmission power, and supplies the amplified signals to antenna unit 5. The gain of transmission amplifier 13 is controlled in accordance with the LO signal output power changing instruction supplied from controller 1.

Variable attenuator 14 changes the amount of attenuation provided thereby in accordance with the LO output power changing instruction supplied from controller 1, adjusts the IF power supplied from baseband/IF unit 3, and supplies the IF signal to mixer unit 12. Low-noise amplifier 15 amplifies the RF signal received by antenna unit 5, and supplies the amplified RF signal to detector 16. Detector 16 converts the RF signal supplied from low-noise amplifier 15 to an IF signal which is supplied to baseband/IF unit 3. Transmission/reception change-over switches 11 and 18 each switch transmission/reception in accordance with a transmission/reception change-over control signal from controller 1.

Figure 6:
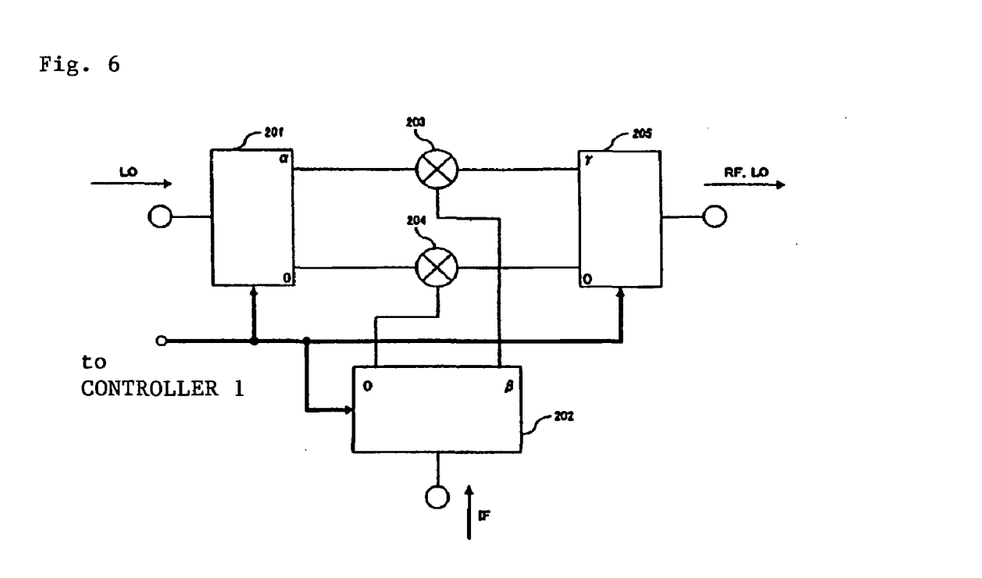
FIG. 6 is a diagram illustrating mixer unit 12 in a first embodiment of the present invention.

FIG. 6 illustrates the circuit configuration of mixer unit 12 in the first embodiment of the present invention. Mixer unit 12 comprises LO signal power splitter 201, IF signal power splitter 202, mixers 203 and 204, and RF signal power combiner 205. Active baluns, for example, are used for power splitters 201 and 202 and power combiner 205. Power splitter 201 splits an LO signal into two components, which are equal in amplitude and have phase difference $\alpha$, and are supplied to mixers 203 and 204.

Power splitter 202 splits the IF signal into two components, which are equal in amplitude and have phase difference $\beta$, and are supplied to mixers 203 and 204. Mixers 203 and 204 each up-convert the IF signal supplied from power splitter 202 to an RF signal frequency band with the LO signal supplied from power splitter 201 to generate an RF signal which is supplied to power combiner 205 simultaneously with the LO signal used in the up-conversion. Power combiner 205 combines the RF signal and LO signal supplied from mixers 203 and 204 with phase difference $\gamma$, and delivers the combined signal. Power splitters 201 and 202, and power combiner 205 change their respective phase differences in accordance with the LO output power changing instruction supplied from controller 1 to the mixer unit. The relationship among the phase differences is established to satisfy the aforementioned equation (2), i.e., $$\alpha-\beta+\gamma=(2n+1)\pi \text{ (n is an integer)}$$

in order to maximize the amount of rejection for an image signal.

Figure 7:
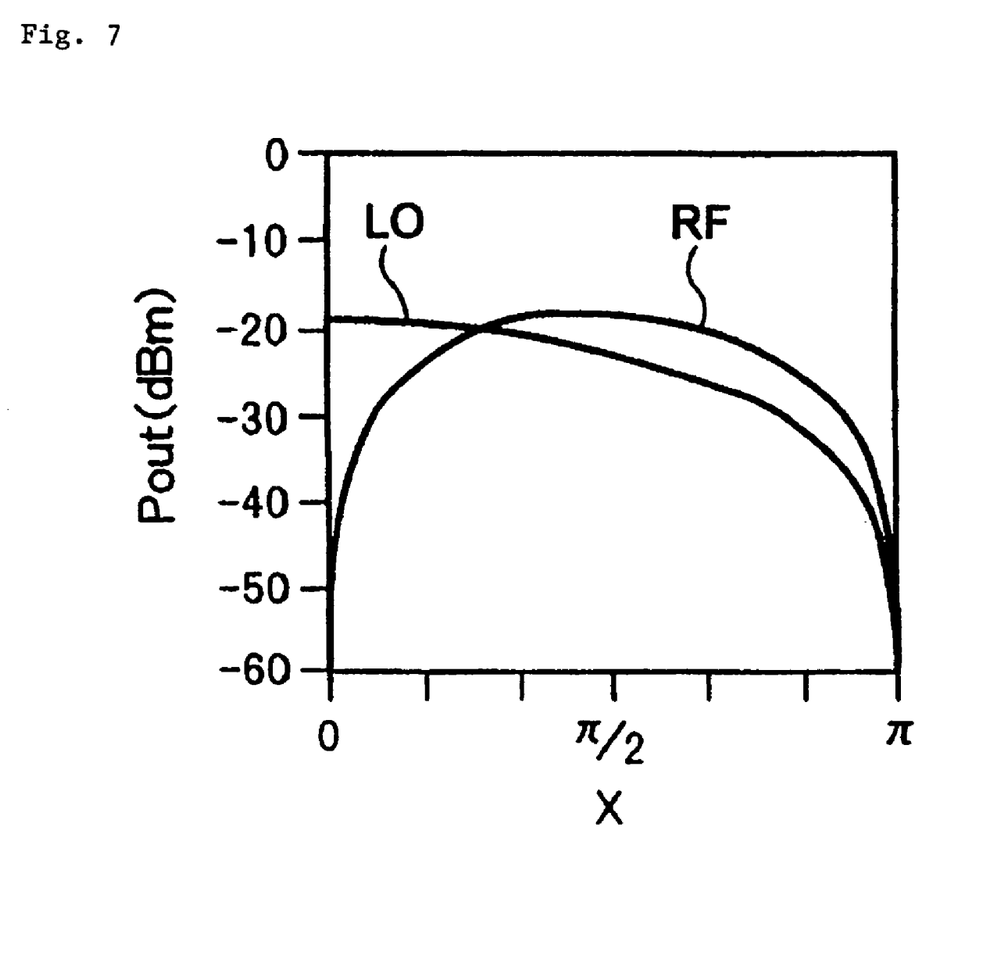
FIG. 7 is a diagram showing a change in output power with respect to a change in phase, by mixer unit 12 in the first embodiment of the present invention.
Figure 8A:
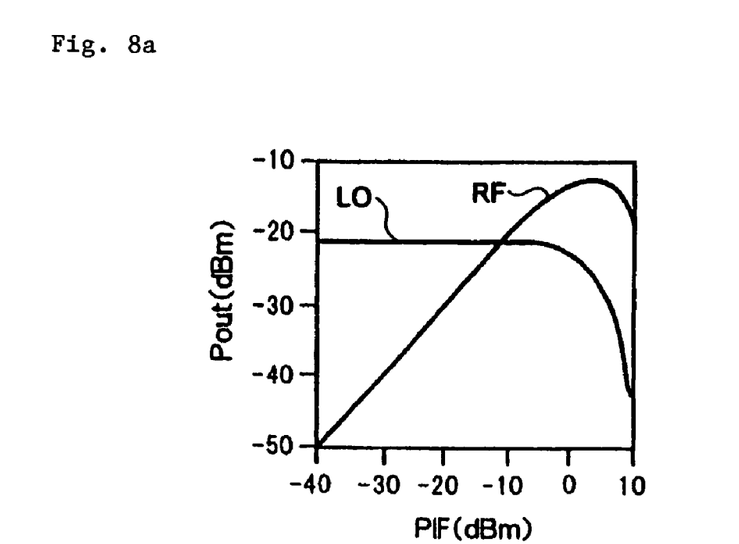
FIG. 8a is a diagram showing the phase dependence of the input/output characteristic in mixer unit 12, when X=(⅙)π, in the first embodiment of the present invention.
Figure 8B:
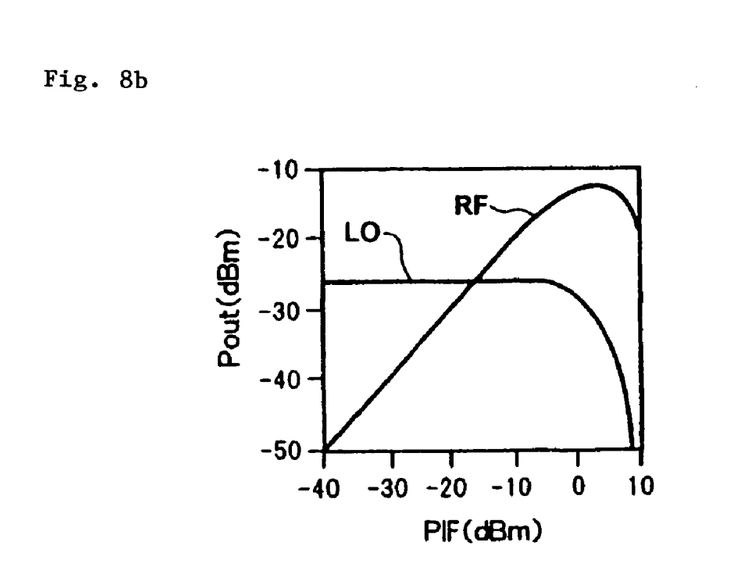
FIG. 8b is a diagram showing the phase dependence of the input/output characteristic in mixer unit 12, when X=(½)π, in the first embodiment of the present invention.

In this event, when $\alpha+\gamma=X$, $\beta=X-(2n+1)\pi$. FIG. 7 shows the result of calculating a change in LO output power and a change in RF output power with respect to phase $X(=\alpha+\gamma)$ using a high frequency circuit calculation software application. It can be understood that the LO output power and RF output power can be controlled by controlling phase X. FIG. 8a shows a change in the RF signal and LO signal delivered from mixer unit 12, with respect to the IF signal power, which is calculated using the high frequency circuit calculation software application, when $X=(\frac{1}{6})\pi$. FIG. 8b shows the result of the calculation when $X=(\frac{1}{2})\pi$; and FIG. 8c when $X=(\frac{5}{6})\pi$, respectively.

Figure 8C:
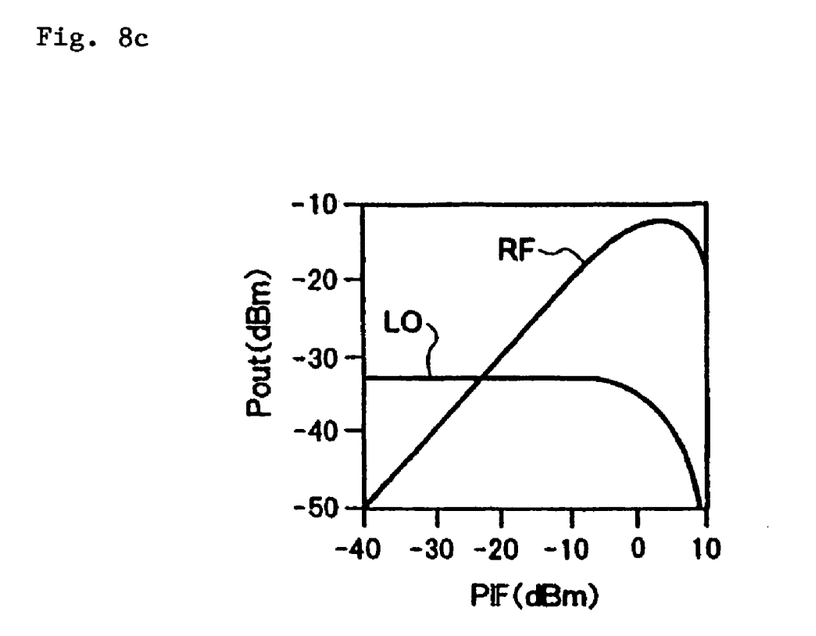
FIG. 8c is a diagram showing the phase dependence of the input/output characteristic in mixer unit 12, when X=(⅚)π, in the first embodiment of the present invention.

Assuming that mixer unit 12 output power is in a linear operation region of the transmission amplifier next to mixer unit 12, the back-off amount is determined by mixer unit 12 output. Therefore, the back-off amount, calculated for the respective phases from FIGS. 8a-8c, is 6 dB when $X=(\frac{1}{6})\pi$; 11 dB when $X=(\frac{1}{2})\pi$; and 17 dB when $X=(\frac{5}{6})\pi$. In this way, it is understood that the back-off amount can be changed by changing phase X.

Figure 9:
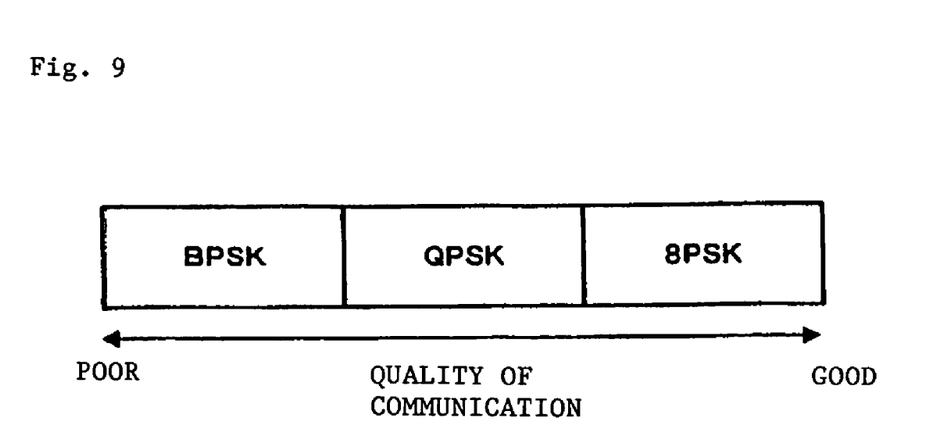
FIG. 9 is a diagram illustrating an exemplary modification to a modulation scheme in controller 1 in FIG. 3.

Assume herein that in controller 1, modulation schemes as shown in FIG. 9 are employed in accordance with BER which represents the quality of communication. Specifically, assume that when the quality of communication is poor, the BPSK (Binary Phase Shift Keying) scheme, which provides the lowest information transmission speed, is employed; when the quality of communication is moderate, the QPSK (Quadrature Phase Shift Keying) scheme, which provides a relatively high information transmission speed, is employed; and when the quality of communication is good, the 8PSK scheme, which provides a high information transmission speed, is employed. Accordingly, controller 1 determines such that $X=(\frac{1}{6})\pi$ is set, as shown in FIG. 8a, for the BGPSK modulation scheme; $X=(\frac{1}{2})\pi$, as shown in FIG. 8b, for the QPSK modulation scheme; and $X=(\frac{5}{6})\pi$, as shown in FIG. 8c, for the 8PSK modulation scheme.

The determination of the modulation scheme and X in this event can be readily made by previously writing an optimal modulation scheme and X value for each BER in a ROM table, and reading them in accordance with the actual BER. As can be appreciated, since the LO output power is uniquely determined when X is determined, the LO output power may be written instead of X.

In FIG. 6, phase difference $\beta$ of power splitter 202 is controlled from controller 1 because when $\alpha$ and $\gamma$ are changed, control must be conducted to satisfy Equation (2) at all times by changing $\beta$ as well in connection therewith. Also, as illustrated in FIG. 5, controller 1 controls the amount by which variable attenuator 14 attenuates an IF signal and the gain of transmission amplifier 13 for the following reason. X is controlled to variably control the back-off amount so as to change the matching point of the LO and RF output power, as shown in each of FIGS. 8a-8c, and in this event, the power of the IF signal must be changed as well, so that variable attenuator 14 is controlled for the amount of attenuation, and the gain of transmission amplifier 13 must be controlled so that it increases in order to simultaneously compensate for the power thus attenuated.

Assume, therefore, that after determining an optimal modulation scheme, controller 1 determines X or LO output power, and simultaneously determines the amount of attenuation of variable attenuator 14, the gain of transmission amplifier 13, and phase difference $\beta$, and controller 1 control the respective components.

Second Embodiment

Figure 10:
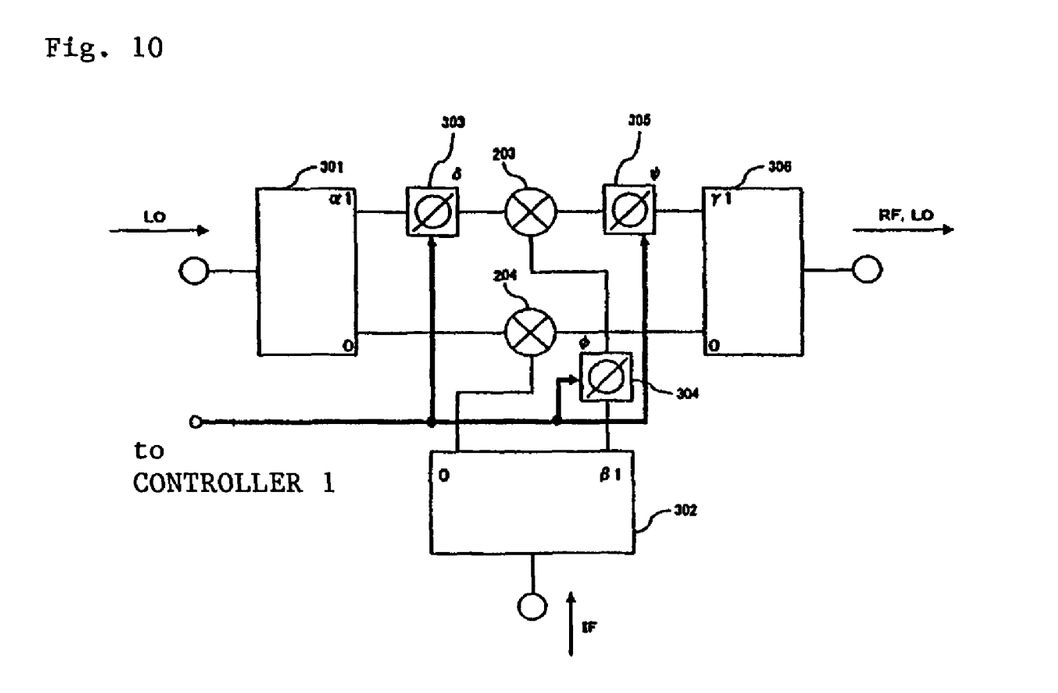
FIG. 10 is a diagram illustrating mixer unit 12 in a second embodiment of the present invention.

FIG. 10 illustrates a second embodiment of the present invention. The configuration other than mixer unit 12 is similar to the first embodiment. Mixer unit 12 in the second embodiment comprises LO signal power splitter 301, IF signal power splitter 302, LO signal phase shifter 303, IF signal phase shifter 304, RF signal phase shifter 305, RF signal power combiner 306, and mixers 203 and 204.

Power splitter 301 splits an LO signal into two components which are equal in amplitude and have phase difference α1; power splitter 302 splits an IF signal into two components which are equal in amplitude and have phase difference β1; and power combiner 306 combines the RF signal and LO signal with phase difference γ1. Phase shifter 303 shifts the phase of the LO signal by δ; phase shifter 304 shifts the phase of the IF signal by φ; and phase shifter 305 shifts the phases of the RF and LO signals by ψ. Wilkinson power splitters, branch line couplers, Lange couplers, and rat race circuits, for example, are used for the power splitters and power combiner, and phase differences α1, β1, γ1 may be fixed.

On the other hand, active phase shifters, for example, are used for the phase shifters. Phase shifters 303, 304, 305 each vary the amount by which the phase is changed in accordance with an LO output power changing instruction supplied from controller 1.

The relationship among the phases is established to satisfy:

$$(\alpha 1+\delta)-(\beta 1+\phi)+(\gamma 1+\psi)=(2n+1)\pi \quad (4)$$

in order to maximize the amount of rejection for an image signal. In this example, $$X=(\alpha 1+\delta)+(\gamma 1+\psi)$$

is established, so that when α1 and γ1 are fixed, δ, ψ are variable. Also, like the previous embodiment, φ is a variable as well in order to satisfy Equation (4), as a matter of course, and is controlled by controller 1 together with δ, ψ.

Third Embodiment

Figure 11:
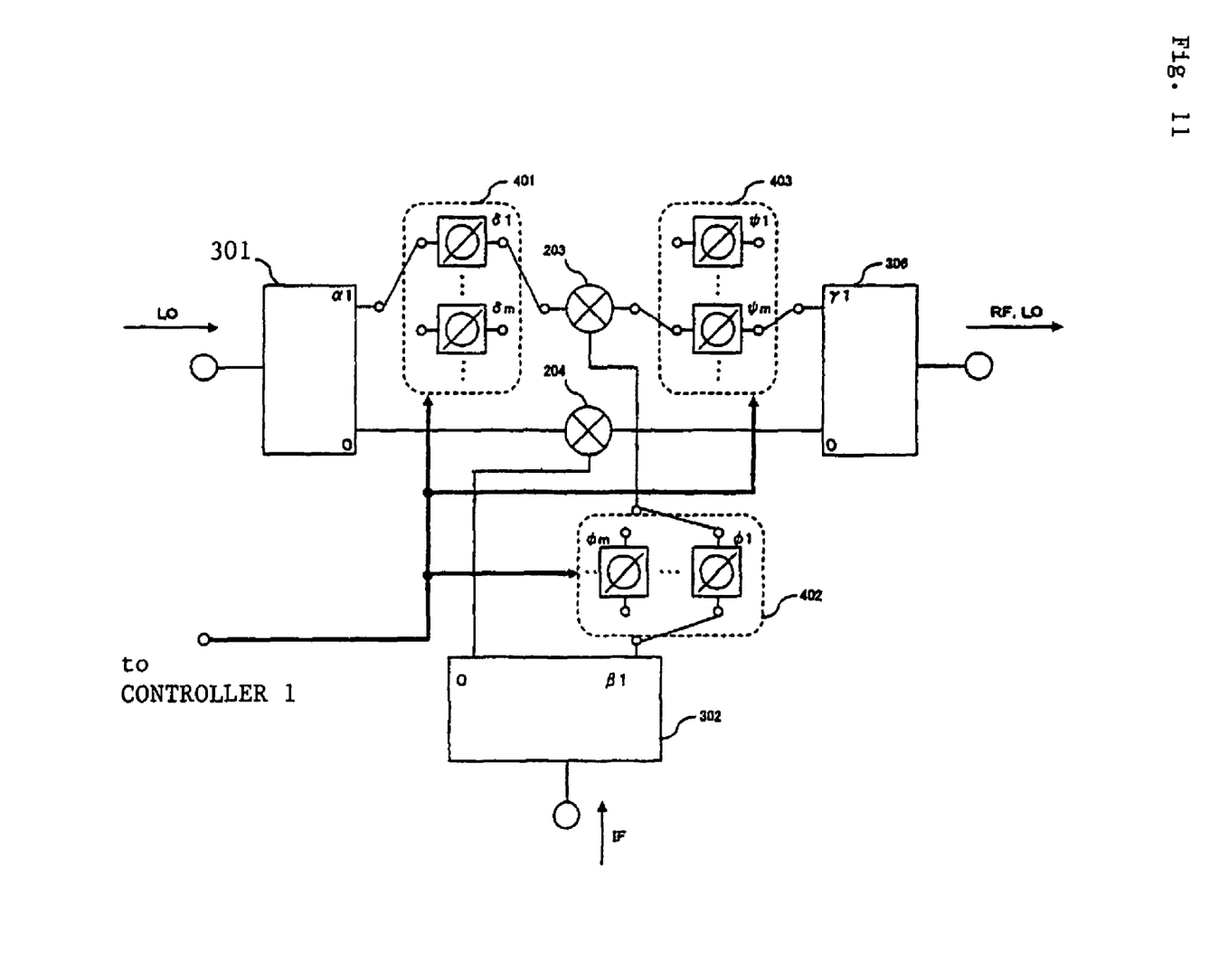
FIG. 11 is a diagram illustrating the mixer unit 12 in a third embodiment of the present invention.

FIG. 11 illustrates the configuration of mixer unit 12 in a third embodiment of the present invention. The configuration other than mixer unit 12 is similar to the first embodiment. Mixer unit 12 in the third embodiment comprises LO signal power splitter 301, IF signal power splitter 302, RF signal power splitter 306, LO signal phase shifter switching unit 401, IF signal phase shifter switching unit 402, RF signal phase shifter switching unit 403, and mixers 203 and 204.

Power splitters 301 and 302 and power combiner 306 are similar to those in the second embodiment. Phase shifter switching unit 401 comprises at least two phase shifters, and switches to any of phase shifters which provide phase changing amounts (phase shifting amounts) δ1-δm, in accordance with an LO output power changing instruction from controller 1. Likewise, phase shifter switching unit 402 switches to φ1-φm in accordance with the LO output power changing instruction from controller 1. Phase shifter switching units 403 switches to ψ1-ψm in accordance with the LO output power changing instruction from controller 1.

A phase shifter comprises, for example, a transmission line, an inductor, a capacitor, or a combination of them. The relationship among the phases is established to satisfy:

$$(\alpha 1+\delta i)-(\beta 1+\phi j)+(\gamma 1+\psi k)=(2n+1)\pi \quad (5)$$

in order to maximize an image signal rejection amount. Each of i, j, k is 1~m.

Fourth Embodiment

Figure 12:
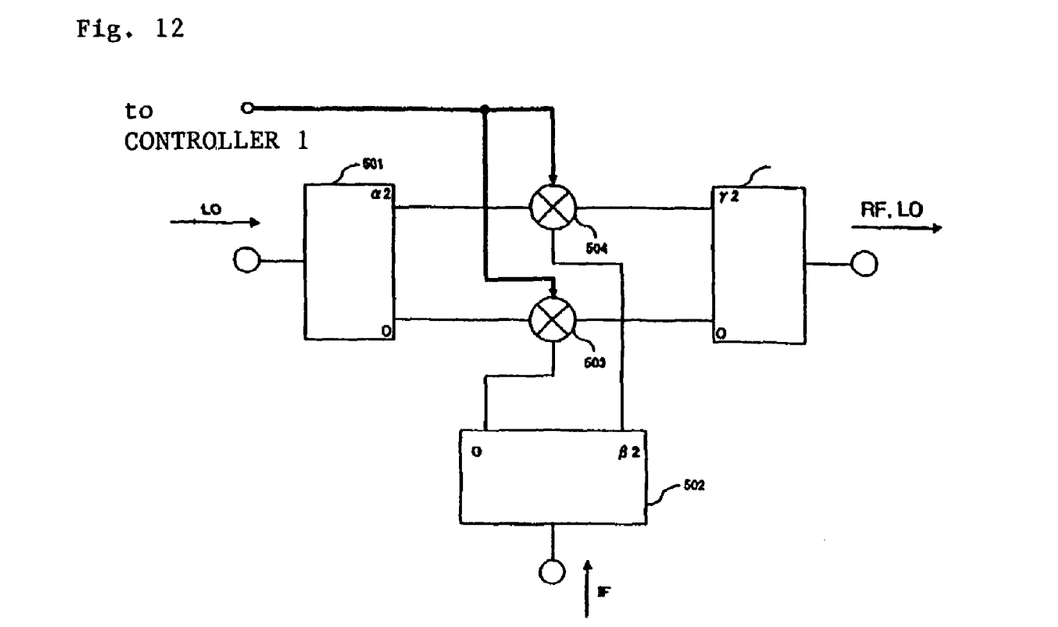
FIG. 12 is a diagram illustrating mixer unit 12 in a fourth embodiment of the present invention.

FIG. 12 illustrates the configuration of mixer unit 12 in a fourth embodiment of the present invention. The configuration other than mixer unit 12 is similar to the first embodiment. Mixer unit 12 in the fourth embodiment comprises LO signal power splitter 501, IF signal splitter 502, mixers 503 and 504, and RF signal power combiner 505.

Power splitter 501 splits an LO signal into two components which are equal in amplitude and have phase difference α2. Power splitter 502 splits equally an IF signal into two components which have phase difference β2. Power combiner 505 combines the RF signal and LO signal with phase difference γ2. The phase relationship is set to satisfy:

$$\alpha 2+\beta 2+\gamma 2=2n\pi \text{ and } \alpha 2-\beta 2+\gamma 2=(2n+1)\pi$$

in order to maximize an image rejection ratio.

Figure 13:
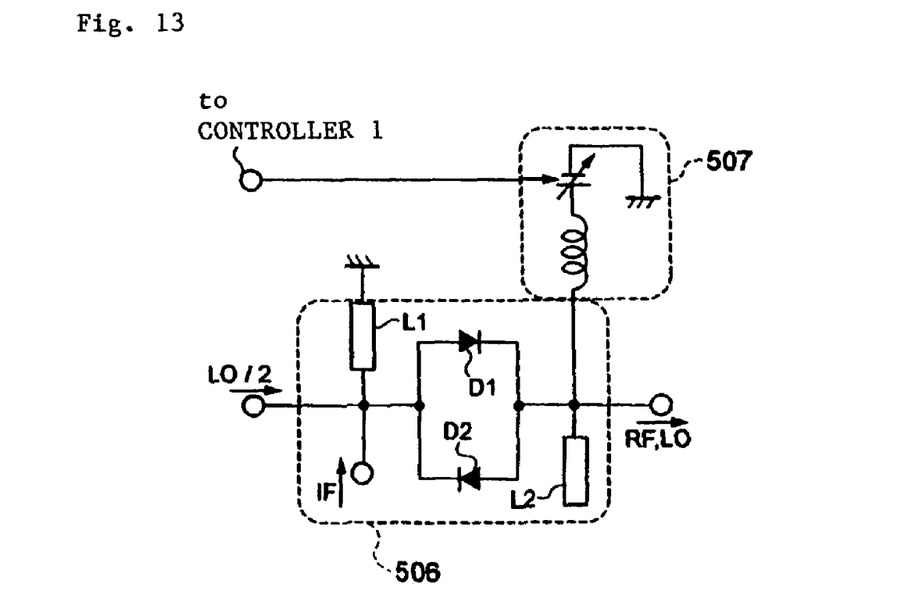
FIG. 13 is a circuit diagram illustrating a specific example of a mixer in FIG. 12.

An LO output power changing instruction from controller 1 is supplied to mixers 503 and 504 to change the LO power at the output of mixer unit 12. FIG. 13 illustrates mixers 503 and 504 which are used as anti-parallel diode pair mixer disclosed, for example, in Japanese Patent Application No. 2002-307136 proposed by the inventors and others of the present application.

When this anti-parallel diode pair mixer is used, a local oscillation frequency is one half of an LO signal frequency of a mixer output, and the phase relationship between the power splitters and power combiner is set to establish:

$$2\times\alpha 2+\beta 2+\gamma 2=2n\pi \text{ and}$$

$$2\times\alpha 2-\beta 2+\gamma 2=(2n+1)\pi$$

Mixers 503 and 504 each comprise anti-parallel pair diode mixer 506 which employs two diodes D1 and D2 which differ in junction area from each other (in other words, differ in impedance), and a bias unit 507 for applying a bias to this mixer. L1 represents a short stab, and L2 represents an open stab, and they are set to a length equal to the electric length of a one-half wavelength of the LO signal. Anti-parallel pair diode mixer 506 is applied at the input with a signal (LO/2) at a frequency one half as high as that of the IF signal and LO signal, and delivers an RF signal and the LO signal from the output.

Figure 14:
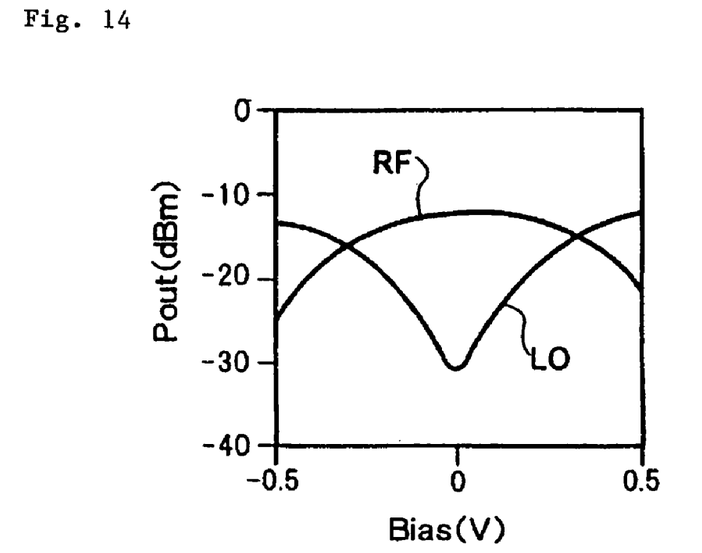
FIG. 14 is a diagram showing the bias dependence of output power in a mixer in FIG. 13.

The magnitude of a DC voltage of bias unit 507 is controlled in accordance with an LO output power changing instruction supplied from controller 1. FIG. 14 shows changes in the LO output power and RF output power with respect to a change in DC voltage. It can be seen that as the DC voltage is increased, the LO output power increases. Accordingly, the LO output power can be controlled to be optimal for a modulation scheme by controller 1 by changing the DC voltage.

Fifth Embodiment

Figure 15:
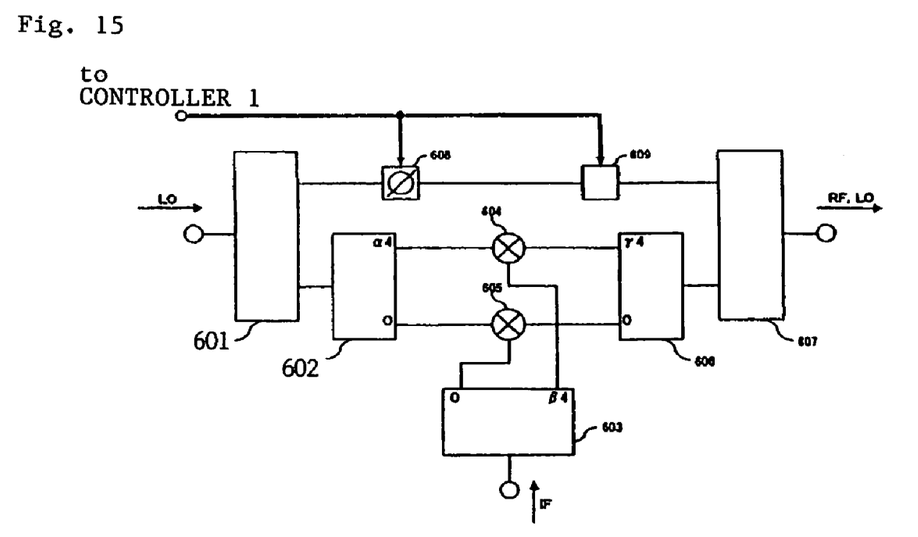
FIG. 15 is a diagram illustrating mixer unit 12 in a fifth embodiment of the present invention.

FIG. 15 illustrates the configuration of mixer unit 12 in a fifth embodiment of the present invention. The configuration other than mixer unit 12 is similar to the first embodiment. Mixer unit 12 in the fifth embodiment is similar in configuration to a mixer circuit described in FIG. 9 of Japanese Patent No. 3268574, and is configured to control the phase and amplitude, with the aid of phase shifter 608 and attenuator 609, in accordance with an LO output power changing instruction from controller 1.

Power splitter 601 splits the LO signal into two components. One component of the LO signal split by power splitter 601 is supplied to power splitter 602, and is split with an equal amplitude and phase difference α4. Power splitter 603 splits the IF signal with an equal amplitude and phase difference β4. Mixers 604 and 605 generate an RF signal from an IF signal and an RF signal split by power splitters 602 and 603, and delivers the RF signal together with the LO signal.

The RF signal and LO signal delivered from mixers 604 and 605 are combined in power combiner 606 with phase difference γ4. The other LO signal split by and delivered from power splitter 601 is changed in phase by phase shifter 607 in accordance with an LO output power changing instruction from controller 1. The LO signal, which has been changed in phase, combines the RF signal and LO signal at the output of power combiner 606, with the LO signal at the output of attenuator 608.

The phase relationship among power splitters 602 and 603 and power combiner 606 is set to satisfy:

$$\alpha 4+\beta 4+\gamma 4=2n\pi \text{ and } \alpha 4-\beta 4+\gamma 4=(2n+1)\pi$$

in order to maximize an image rejection ratio.

Sixth Embodiment

Figure 16:
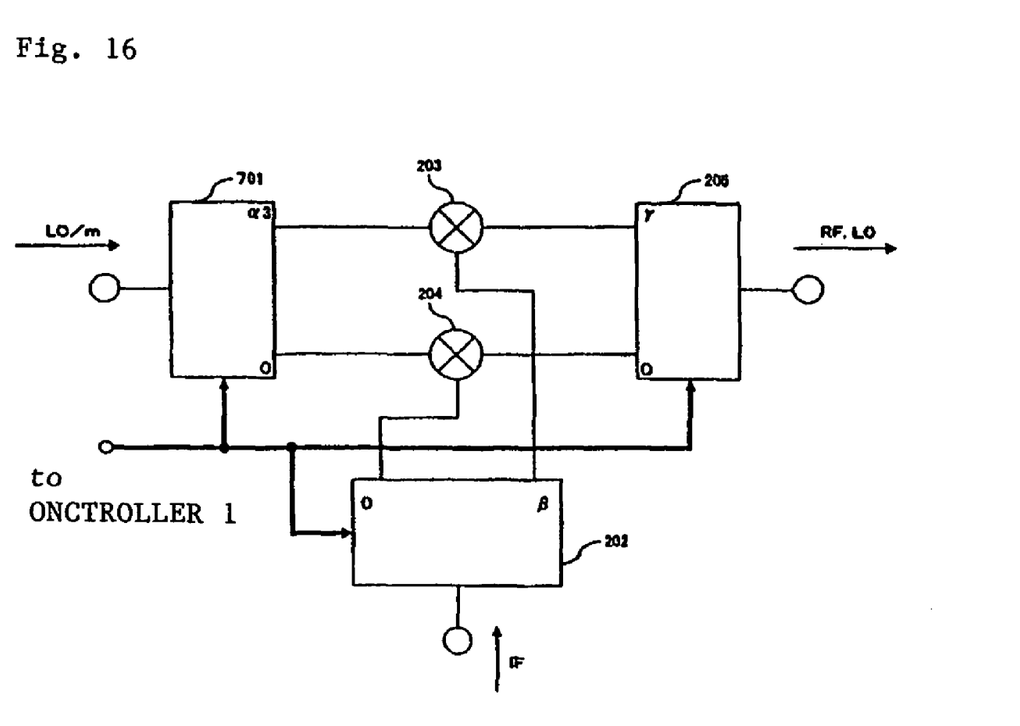
FIG. 16 is a diagram illustrating mixer unit 12 in a sixth embodiment of the present invention.

FIG. 16 illustrates the configuration of mixer unit 12 in a sixth embodiment of the present invention. The circuit configuration of this mixer unit 12 is similar to the first embodiment illustrated in FIG. 6, but the local oscillation signal frequency is 1/m (m is an integer) of an LO signal at the output of mixer unit 12. Power splitter 701 equally splits a local oscillation signal LO/m, and deliver the signals with phase difference α3. In this event, the phase relationship is set to satisfy:

$$m\times\alpha 3-\beta+\gamma=(2n+1)\pi$$

in order to maximize an image rejection ratio. Likewise, in this event, X=m×α3+γ is established, and the LO output power changes by controlling X and β in controller 1.

In the foregoing embodiments, the bit error rate (BER) for a received signal has been employed as an example of the quality of communication, but other CNR (Carrier to Noise Ratio), SNR (Signal to Noise Ratio) or the like may be used as long as it is information indicative of the quality communication. Also, modulation schemes which are changed in accordance with the quality of communication are not limited to three stages of the aforementioned BPSK, QPSK, 8PSK, but faster modulation schemes can also be added, such as 16QAM (Quadrature Amplitude Modulation) and the like.

Further, instead of measuring the information of the quality of communication by bit error rate detector 4 in a receiver unit of own apparatus, as in the example illustrated in FIG. 3, signal quality information such as BER measured by a communication partner can be received, and a modulation scheme and back-off amount (i.e., the LO output power) can be controlled in accordance with this. Also, the operation of controller 1, i.e., the operation flow illustrated in FIG. 4, may have been previously stored in a recording medium such as ROM as a program, which can be read and executed by a computer (CPU), as a matter of course.

The invention claimed is:

1. A radio communications apparatus for simultaneously transmitting a local oscillation signal used when an intermediate frequency band signal is converted to a radio frequency band signal by a mixer unit, and the radio frequency band signal, comprising:

a control unit configured to change a modulation scheme in accordance with the quality of communication and controlling an output power of the local oscillation signal, wherein said mixer unit can control an output power of the local oscillation signal under the control of said control unit, wherein said mixer unit has:

a first power splitter for equally splitting the local oscillation signal with phase difference α2;

a second power splitter for equally splitting the intermediate frequency band signal with phase difference β2;

a first and a second mixer each for mixing the local oscillation signal delivered from said first power splitter with the intermediate frequency band signal delivered from said second power splitter; and a power combiner for combining a radio frequency band signal generated from said first mixer and a radio frequency band signal generated from said second mixer with equal power and phase difference γ2, wherein a DC bias to said mixer is controlled by said control unit under a relationship of:

$$\alpha 2+\beta 2+\gamma 2=2n\pi \text{ and } \alpha 2-\beta 2+\gamma 2=(2n+1)\pi \text{ (}n\text{ is an integer).}$$

2. A mixer unit in a radio communications apparatus for simultaneously transmitting a radio frequency band signal and a local oscillation signal used when an intermediate frequency band signal is converted to the radio frequency band signal, said mixing unit comprising:

an output power of the local oscillation signal can be controlled by a control signal in accordance with a quality of communication;

a first power splitter for equally splitting the local oscillation signal with phase difference α2;

a second power splitter for equally splitting the intermediate frequency band signal with phase difference β2;

a first and a second mixer each for mixing the local oscillation signal delivered from said first power splitter with the intermediate frequency band signal delivered from said second power splitter; and a power combiner for combining a radio frequency band signal generated from said first mixer and a radio frequency band signal generated from said second mixer with equal power and phase difference γ2, wherein a DC bias to said mixer is controlled by the control signal under a relationship of:

$$\alpha 2+\beta 2+\gamma 2=2n\pi \text{ and } \alpha 2-\beta 2+\gamma 2=(2n+1)\pi \text{ (}n\text{ is an integer).}$$

* * * * *